US007330463B1

(12) United States Patent
Bradd et al.

(10) Patent No.: US 7,330,463 B1
(45) Date of Patent: Feb. 12, 2008

(54) ENTERPRISE VOICE OVER INTERNET PROTOCOL (VOIP) VIRTUAL PRIVATE NETWORK (VPN)

(75) Inventors: Patrick Bradd, Maidenhead (GB); John Storrie, Maidenhead (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 926 days.

(21) Appl. No.: 10/447,909

(22) Filed: May 28, 2003

(51) Int. Cl.
*H04L 12/66* (2006.01)
*H04L 12/28* (2006.01)
*H04L 12/56* (2006.01)

(52) U.S. Cl. ............................ 370/352; 370/401; 370/467
(58) Field of Classification Search .................... None
See application file for complete search history.

(56) References Cited

U.S. PATENT DOCUMENTS 6,389,005 B1 *  5/2002  Cruickshank ............... 370/352
6,724,747 B1 *  4/2004  Arango et al. ............... 370/352
2003/0007486 A1  1/2003  March et al.
2004/0196787 A1 * 10/2004  Wang et al. .................. 370/229

* cited by examiner

*Primary Examiner*—Ronald Abelson
(74) *Attorney, Agent, or Firm*—Barnes & Thornburg LLP

(57) ABSTRACT

This invention relates to a carrier (service provider) hosted enterprise voice over internet protocol (VoIP) virtual private network (VPN) across a number of sites of an enterprise where said sites are located in a number of different countries. The enterprise VoIP VPN interfaces with the public switched telephone networks (PSTNs) in each of the countries via respective media gateways. The media gateways are controlled by a single network intelligence apparatus (call agent) of the carrier network which is located in one country but which controls all the media gateways interfacing the enterprise VoIP VPN with the PSTNs of the various countries through a network intelligence IP VPN provisioned on a public IP network. The arrangement of the invention negates the need for a network intelligence apparatus to be provisioned in each country in which the enterprise has sites serviced by the enterprise VoIP VPN.

21 Claims, 11 Drawing Sheets

ENTERPRISE VOICE OVER INTERNET PROTOCOL (VOIP) VIRTUAL PRIVATE NETWORK (VPN)

A FIELD OF THE INVENTION

The present invention relates to an enterprise voice over internet protocol (VoIP) virtual private network (VPN) which facilitates enterprise telephony services across enterprise sites located in different countries.

BACKGROUND OF THE INVENTION

For the purposes of this application the terminology Voice over Internet Protocol (VoIP) or telephony are not limited to voice but could be any media, including for example voice, video, instant messaging, combinations of voice and video etc.

For the purposes of this application, the terminology of Public and Private Network are intended to encompass not only truly public or private networks, but may also include enterprise or any network where the IP address space are either private or not. However, the distinction between Public and Private is obviously relative and Private networks are generally more private than Public networks.

Utilising traditional circuit switch technology, telephony VPNs have been available for a considerable time. However, the underlying technology of such telephony VPNs is based on circuit switched, i.e. time division multiplex (TDM) class 4 and class 5, switches and this technology is not conducive to the deployment of carrier hosted telephony VPN service to multi-site enterprises. Today, enterprises demand telephony VPN services from carriers, these services including private dial plans, and VoIP calls, etc between enterprise sites. However, where the enterprise sites are located beyond a serving area of a carrier hosted circuit switch, the carrier (service provider) is forced to implement these telephony VPN services between different TDM switches. As a result, a multi site enterprise solution results in a complicated per user dial plan configuration between geographically diverse circuit switches and requires the "cloning" of per enterprise configuration data on each enterprise switch. This dramatically increases the operating expenses for each enterprise receiving a telephony VPN service from the service provider (SP).

In addition to geographical (distance) limitations, political limitations have also played a role in adding to the complexity of multi-site enterprise telephony VPN solutions. Enterprises having sites located in more than one country present greater technical challenges to circuit switched technologies in providing said enterprise with a telephony VPN solution. Carrier hosted telephony VPN solutions require either a single operator with circuit switches in each country where the enterprise has a site, with the switches being located close to said sites, or collaboration between multiple service providers to configure the enterprise telephony VPN between the networks of all the service providers in involved. Even if this arrangement could be achieved thus overcoming the geographical limitations of circuit switched technology, it is not possible for a traditional TDM circuit switch to provide telephony VPN service in more than one country simultaneously.

IP telephony technology provides a separation of media path control from call processing logic. As a result, the devices that send and receive media (referred to generically as media endpoints) can be placed geographically distant from the network intelligence call processing logic (referred to generically as a call agent (these are also sometimes referred to as MGC, Softswitch, SIP Proxy etc.)). As a result of this removal of the geographical limitations encountered with TDM circuit switched technology, in an IP network a single call agent can provide call processing logic services to media endpoints located at large geographical distances from the call agent. So, for example, an enterprise that may have been previously serviced by multiple circuit switches for geographical reasons, can now be populated with suitable media endpoints (either in the enterprise network or in the service provider network) in order to provide telephony media capability at each enterprise site, and by a single call agent located anywhere in the service provider network. Such an arrangement allows a service provider, when deploying carrier hosted services to enterprises, to consider whether or not a single enterprise should be serviced by a single call agent and, if so, which one of the call agents of the service provider network should be utilised, or if a single enterprise should be serviced by multiple call agents and, if so, which ones. With TDM circuit switch technology, such choices are typically not possible. Consequently, the number of call agents employed in a service provider network to service a single enterprise telephony VPN can be reduced to a small number and possibly only one with a consequent reduction in the operating expenses for such enterprise.

Although IP telephony technology has eliminated the above mentioned geographical limitations, political (country) boundaries remain a problem. In order to place a call agent in a single country but providing service to media endpoints in multiple other countries, a number of technical problems need to be addressed. These problems include the need for the call agent to separately apply as appropriate the dial plans of the various enterprises receiving telephony VPN services from the service provider through said call agent and similarly to separately apply the different dial plans of the public service telephone networks (PSTNs) of the various countries in which the various enterprises being serviced have sites. As such, the call agent must be able to interwork the dialing plans of multiple countries when telephony calls over an enterprise telephony VPN traverses multiple countries. Further, the call agent must have the ability to identify a particular country associated with a particular site of an enterprise where such enterprise has sites in various countries. Also, the Call Agent must be able to simultaneously interwork to the PSTN signalling systems in each country, as well as to each country's regulatory service requirements.

OBJECT OF THE INVENTION

The present invention seeks to provide a method and a system for establishing a telephony VPN for an enterprise having sites in a plurality of countries.

It is a further object of the invention to provide a method and a system for establishing telephony VPNs for enterprises that mitigates or obviates the problems associated with known enterprise telephony VPN solutions.

SUMMARY OF THE INVENTION

According to a first aspect of the present invention, there is provided a method of effecting a call from a first end point having a first type of call parameter and a second end point having a second type of call parameter, wherein at least one of the first and second end points are located within an IP virtual private network (IP VPN) and at least one is a telephony end point, the method comprising:— providing a call agent at a point in a Service Provider Network (SPN), effecting the call in the call agent via a route over the IP VPN; the SPN; or a combination of the IP VPN and the SPN and translating, in the call agent, the call parameters of the call independence on the route selected.

According to a second aspect of the present invention, there is provided a Call Agent in a Service Provider Network (SPN) for effecting a call from a first end point having a first type of call parameter to a second end point having a second type of call parameter wherein at least one of the first and second end points are located in an IP Virtual Private Network (IP VPN) and at least one is a telephony end point, the call agent comprising a route planner for planning the route of the call over the IP VPN, the SPN or a combination thereof; and a translator for translating the call parameters of the call in dependence on the route selected.

According to a third aspect of the present invention, there is provided a computer program product for implementing, in a primary computer system that has a primary mass storage device in which data is stored and that communicates with a backup computer system, a method of effecting a call from a first end point having a first type of call parameters and a second end point having a second type of call parameters, wherein at least one of the first and second end points are located within an IP virtual private network (IP VPN) and at least one is a telephony end point, the method comprising:— providing a call agent at a point in a Service Provider Network (SPN), effecting the call in the call agent via a route over the IP VPN; the SPN; or a combination of the IP VPN and the SPN and translating, in the call agent, the call parameters of the call independence on the network route selected.

According to a fourth aspect of the present invention, there is provided a network for effecting a call from a first end point having a first type of call parameter to a second end point having a second type of call parameter wherein at least one of the first and second end points are located in an IP Virtual Private Network (IP VPN) and at least one is a telephony end point, comprising:

call agent comprising a route planner for planning the route of the call over the IP VPN, the SPN or a combination thereof;

a translator for translating the call parameters of the call in dependence on the route selected; and a media gateway between the IP VPN and the SPN.

DESCRIPTION OF A PREFERRED EMBODIMENT

The foregoing and further features of the present invention will be more readily understood from the following description of a preferred embodiment, by way of example only, with reference to the above designation drawings.

Figure 1:
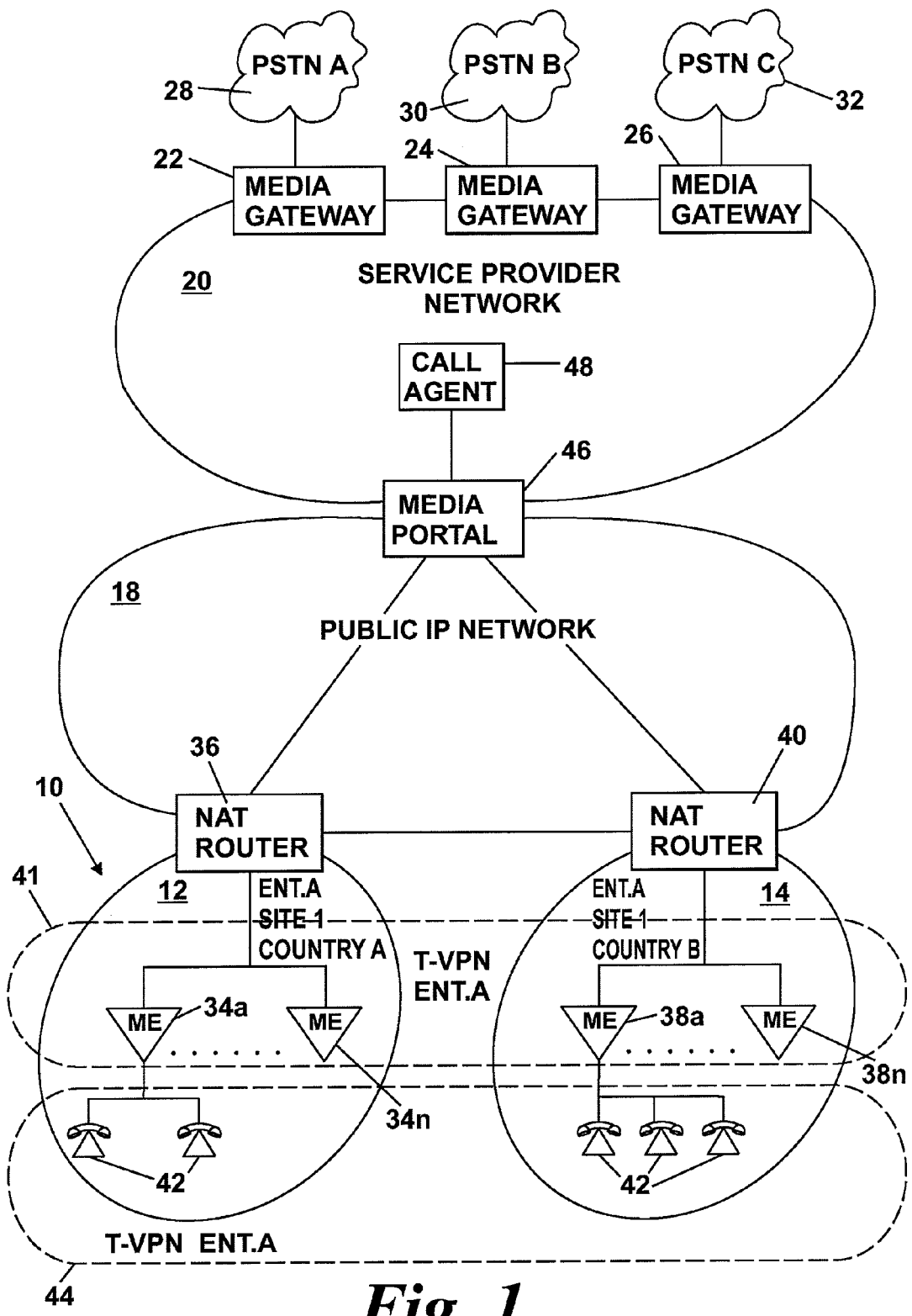
FIG. 1 is a schematic block diagram representing logically a multi site multi country enterprise telephony VPN in accordance with an embodiment of the invention.

Referring to the drawings, FIG. 1 is a schematic block diagram representing logically a service provider (SP) hosted enterprise telephony VPN. In the embodiment depicted by FIG. 1, the enterprise, denoted as "ENT.A" for ease of convenience of describing it here, comprises an enterprise network generally denoted by the numeral 10 comprising a first site 12 in a first country, country A, and a second site 14 in a second country, country B. It will readily be appreciated that the enterprise might have multiple sites in each country and might have multiple sites in many other countries. The enterprise sites 12, 14 are connected by a public IP network 18. In this context, "public IP network", encompasses IP networks such as the internet which are freely accessible by users, subject to users having appropriate hardware and/or service ware (e.g. an internet service provider (ISP) service), and private IP networks owned by SPs, such networks usually being accessible on a subscription or other financial basis by customers of the SPs. The term "SP" can be considered to include the public carrier network operators. In this embodiment, the public IP network 18 is provided and operated by a service provider through a private network 20 of the service provider. The service provider network 20 provides access via media gateways 22, 24 and 26 to PSTNs 28, 30 and 32 located respectively in countries A, B and C. It will be appreciated that the service provider network 20 might provide access to further PSTNs (not shown) of other countries and also to other networks and various network services as described in applicant's currently pending U.S. patent application Ser. No. 08/881,595 entitled "Network Address and/or Port Translation", the content of which is incorporated herein by way of reference. It will also be appreciated that there may be more than one enterprise VPN and there may be more than one PSTN gateway per PSTN.

ENT.A site 1 in country A (12) comprises a network of media endpoints (MEs) 34*a* . . . *n*, served by a network address translator (NAT) router 36. Similarly, ENT.A site 1 in country B (14) comprises a network of MEs 38*a* . . . *n* served by a NAT router 40. The ENT.A sites in both countries could also share the same NAT router, and this NAT router could either be service provider hosted or enterprise hosted. The MEs 34, 38 may comprise user terminals such as personal computer (PC) workstations, network telephones (i.e. telephones having a network interface to enable communication with a packet based network) or other terminals capable of participating in real time interactive communications sessions. The sites of ENT.A may utilise a non-overlapping, common private IP address space. As such, these sites comprise a single IP VPN (denoted logically by dashed line 41 in FIG. 1). Some of the MEs 34, 38 in ENT.A network 10 have connected thereto telephony devices or have integrated therewith telephony capabilities (represented logically by numeral 42 in FIG. 1). The telephony devices and/or telephony capabilities 42 comprise a single telephony VPN (denoted logically by dashed line 44 in FIG. 1) across the two sites of the ENT.A network 10. The telephony VPN (T-VPN) is served by the IP VPN 41.

Once a call is established between an ME of the ENT.A network 10 and another endpoint in the telecommunications network, media or bearer traffic may be communicated between said endpoints through a media portal device 46 (sometimes referred to as a media proxy, the two terms shall be used interchangeably herewithin). Media portal devices are familiar to a skilled artisan and need not be described herein. In the preferred embodiment of the invention, the media portal device may operate in a manner consistent with that described in applicant's currently pending US 2003/0007486. Media goes through media proxy if and only if the media needs to leave the enterprise IP VPN.

The service provider network 20 has one or more call agents 48 which process call requests initiated by MEs of the ENT.A network 10. A skilled artisan will be familiar with the structure of a call agent for processing call requests in VoIP networks and thus the structure of such call agent need not be discussed herein.

The public IP network 18 has no geographical or political limitations. Consequently, the IP VPN 40 also has no such limitations. However, the T-VPN 44, whilst not being geographically limited, has political limitations due to the different dialing plans and the various PSTN signalling systems to which it must interwork, for example, utilised in the respective country specific PSTNs 28, 30 and 32.

It will be appreciated that the service provider network 20 may comprise a plurality of call agents 48 where each such call agent is separately configured by the SP to service a single enterprise customer of the SP or a small number of enterprise customers of the SP. Equally, the SP may provision more than one call agent to an enterprise customer network but, for ease of convenience in the following description, it is assumed that ENT.A network 10 is serviced by a single call agent, namely call agent 48, of service provider network 20.

The media gateways 22, 24, 26 are each controlled by the call agent 48 via a device control protocol such as the Media Gateway Control Protocol (MGCP) as described in the Internet Engineering Task Force (IETF) Request for Comments (RFC) 2705, entitled "Media Gateway Control Protocol (MGCP), Version 1.0", dated October 1999 or the H.248 Recommendation from the International Telecommunications Union (ITU) or via SIP or H.323.

Figure 2:
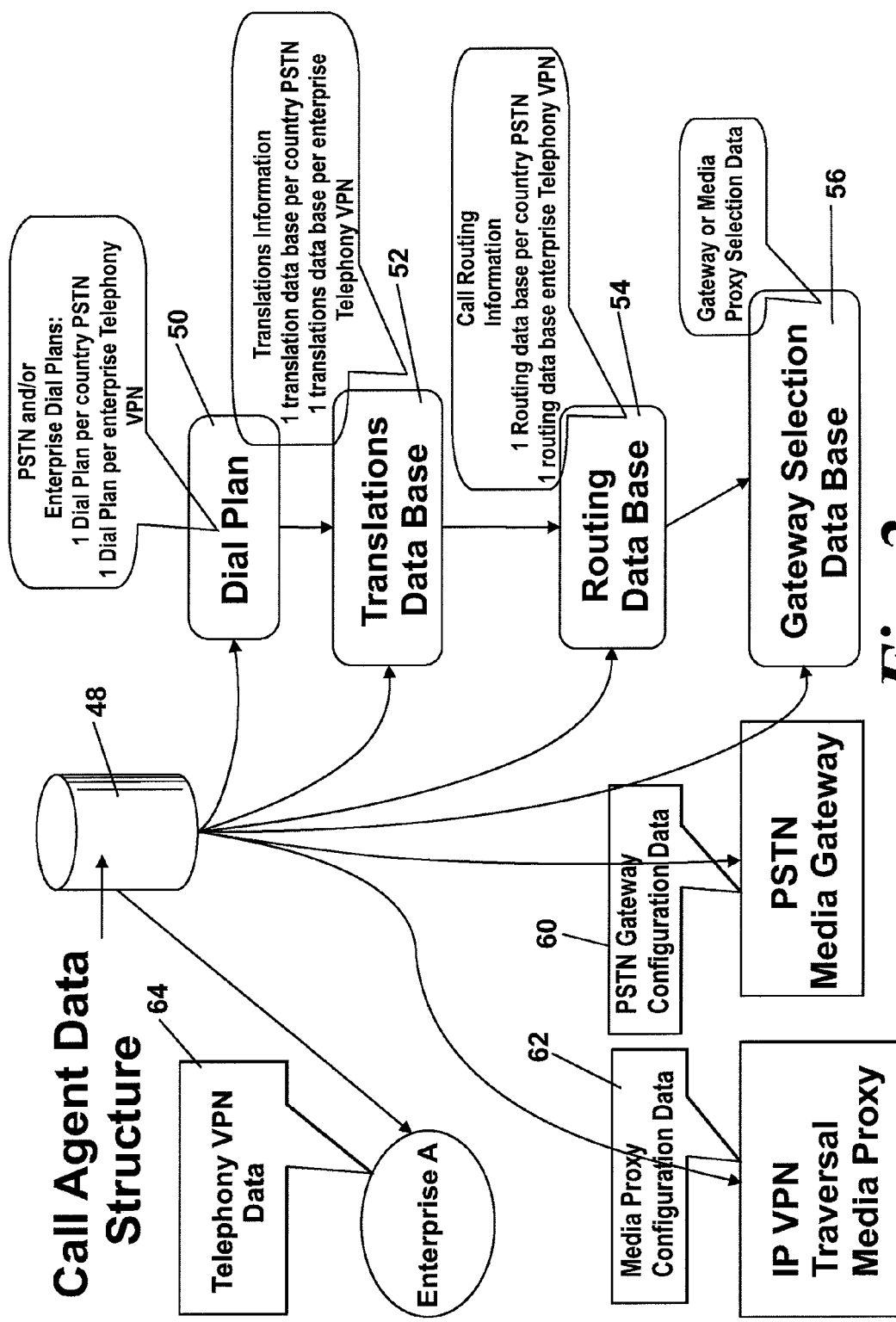
FIG. 2 is a block schematic diagram of a service provider call agent for a service provider hosted enterprise telephony VPN in accordance with the invention.

To establish a VoIP call connection between two telephony enabled MEs of the T-VPN 44 of ENT.A network 10, an originating telephony enabled ME initiates a call request which is conveyed to the call agent 48 for processing. The call agent 48 processes received call requests in accordance with the process steps illustrated by FIGS. 3*a* to 3*c*. To implement the call process steps illustrated by the flow chart of FIGS. 3*a* to 3*c*, the call agent 48 has a data structure as schematically depicted in FIG. 2.

The call agent 48 data structure consists of a dial plan database 50 which contains a dial plan for each of the country PSTNs 28, 30 and 32 together with a dial plan for each enterprise T-VPN which, for the embodiment depicted in FIG. 1, comprises only T-VPN 44 of ENT.A network 10. The dial plan database 50 provides a means by which an originating ME 42 can be identified.

The call agent 48 data structure also consists of a translations database 52 which in turn comprises a translations database per country PSTN 28, 30 and 32 together with a translations database for the T-VPN 44. The translations database provides a means by which a destination telephony ME can be identified.

The call agent 48 data structure also includes a routing database 54 which in turn comprises a routing database per country PSTN, 28, 30, 32 together with a routing database for the T-VPN 44. The routing database selects a relevant route between an originating telephony ME 42 and a destination telephony ME based on knowledge gained from call request data relating to the identities of said originating and destination MEs.

The call agent 48 data structure also includes a gateway selection database 56 which comprises data relating to the various PSTN media gateways 22, 24 and 26 and any network media portals, which in the present embodiment comprises media portal 46. The gateway selection database 56 maps media gateways to suitable media portals, where appropriate, to the routes between the originating telephony ME 42 and the destination telephony ME previously identified from call signalling data contained in the call request received by the call agent 48. The call agent 48 also contains configuration data (denoted by numeral 60 in FIG. 2) for the various PSTN gateways 22, 24 and 26 together with configuration data for the media portal/proxy (denoted by numeral 62 in FIG. 2). Data describing the T-VPN 44 for ENT.A network 10 also forms part of the data structure of the call agent 48 and is utilised by the call agent 48 in processing call requests.

Figure 3A:
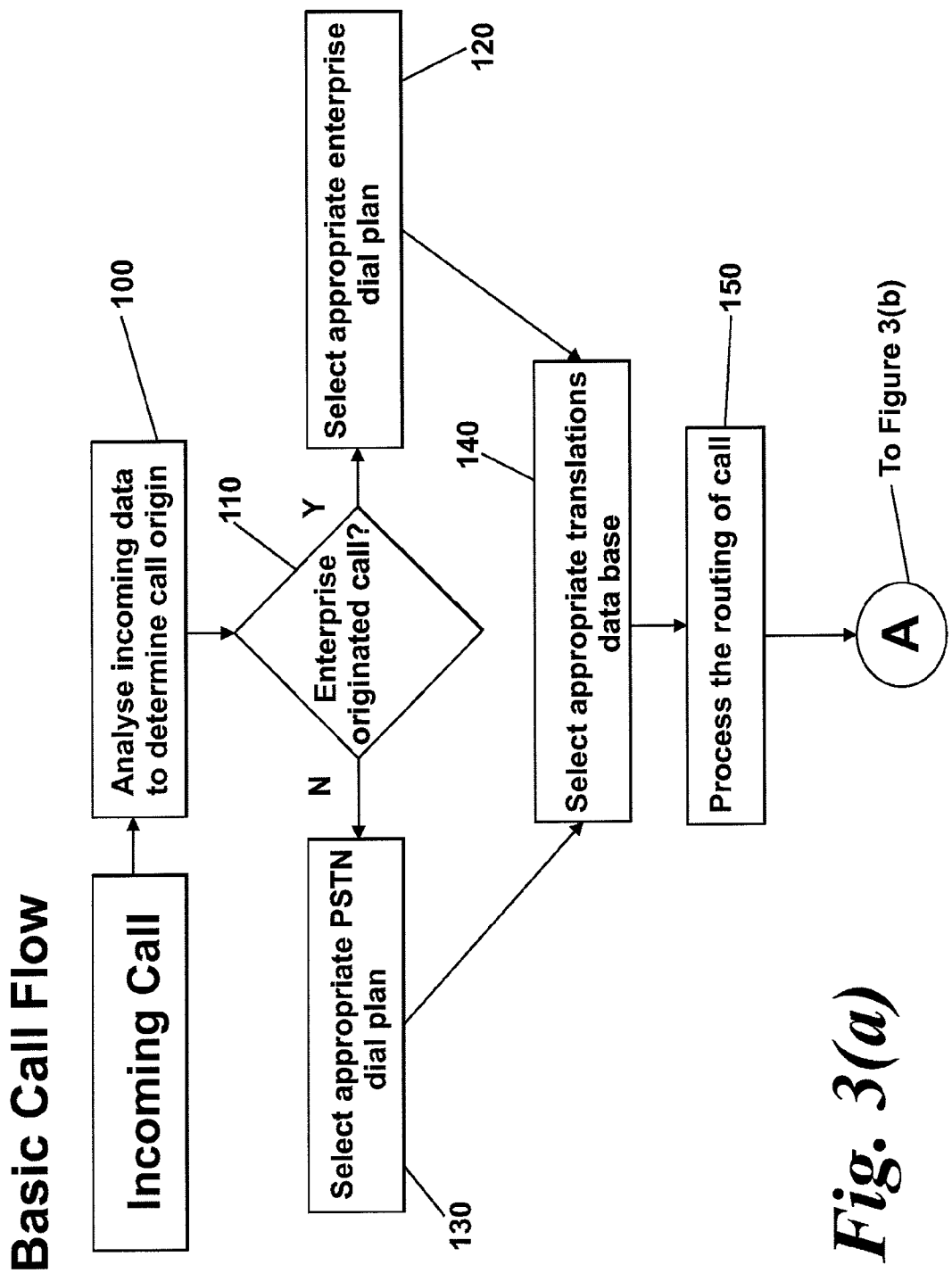
FIG. 3 (comprising FIGS. 3(*a*) to 3(*c*)) a flow chart illustrating the process steps for establishing a call between end points through an enterprise telephony VPN in accordance with the invention.

Referring now to FIG. 3*a*, when an incoming call request is received at call agent 48, it is analysed by the call agent to determine the origin of the call (step 100). Based on this analysis, a determination (decision point 110) is made as to whether the call request has originated in an enterprise network. In the case that said call request has originated in an enterprise network, the call agent 48 retrieves an appropriate enterprise dial plan for the enterprise from which the call request originated from its dial plan database 50 (step 120). However, if the analysis of the call signalling data contained in the call request determines that the call request has originated in a PSTN then the call agent 48 selects from its dial plan database 50 the dial plan for the appropriate PSTN (step 130). Whether the call request originated in an enterprise or in a PSTN, once an appropriate dial plan has been selected based on an analysis of said call request call signalling data, the call agent 48 identifies from its translations database 52 an appropriate translation database relating to said selected dial plan (step 140). The selected translations database provides the means by which the call agent 48 can instruct the routing of the call between an originating telephony ME and a destination telephony ME (step 150).

Figure 3B:
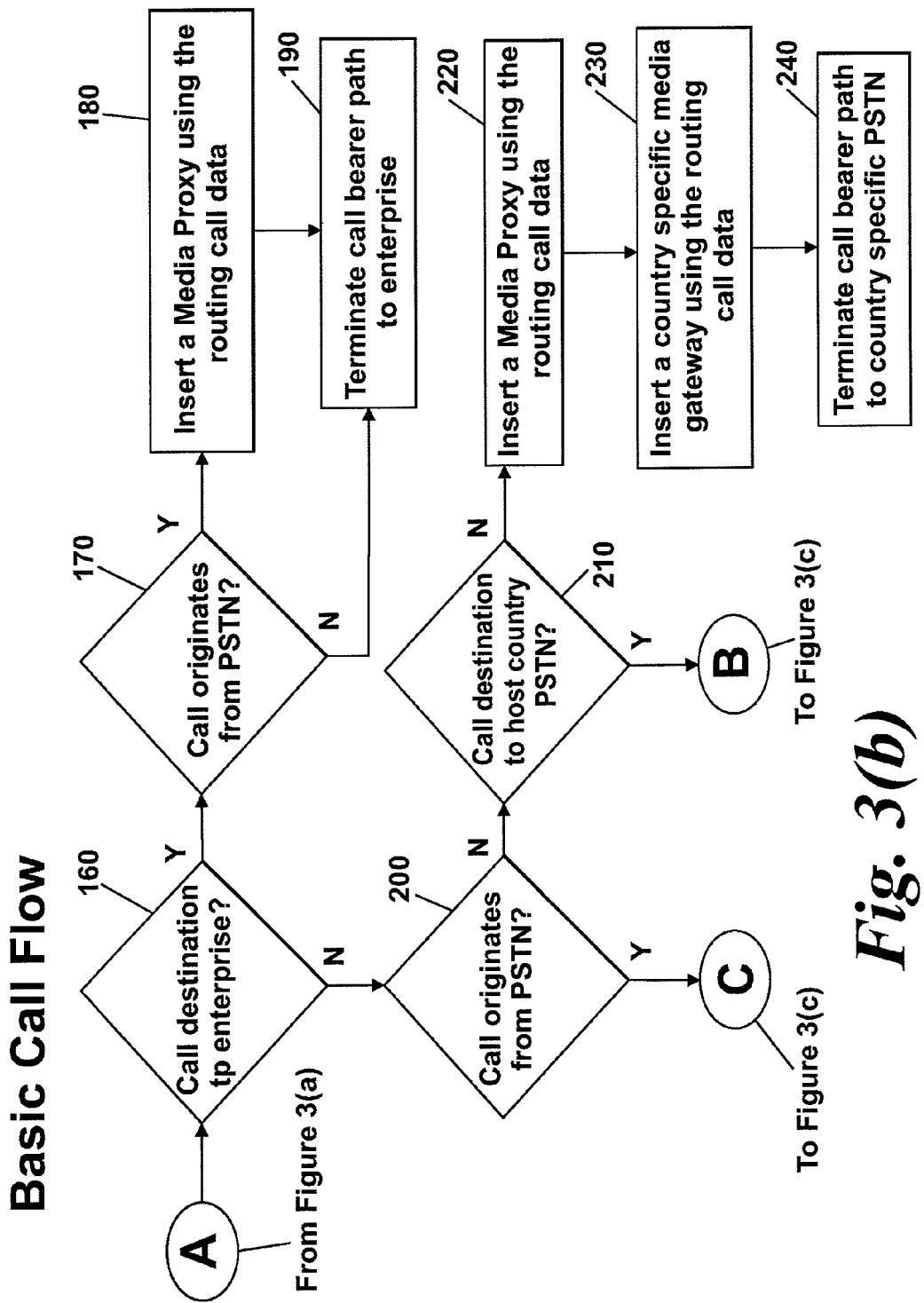

Referring now to FIG. 3*b*, the process of routing a call requires a determination of whether the call destination resides in an enterprise (decision point 160). If this determination is in the affirmative, a further determination (decision point 170) is made as to whether the call request originated in a PSTN. In the event that the caller request is determined to be destined to an enterprise and to have originated from a PSTN then the call agent 48 provisions an appropriate media portal using the routing call data to enable a VoIP telephony call to be established through the enterprise IP VPN, between the enterprise telephony enabled ME to the media portal, and via the service provider IP network to a media gateway associated with the PSTN of the originating telephony ME (step 180). Similarly a media portal is needed if going from a media enterprise VPN to another.

In the case where analysis of the call signalling data of the call request indicates that the originating telephony ME, is an enterprise telephony enabled ME and that similarly the destination ME is an enterprise telephony enabled ME then the call agent 48 provisions a call bearer path through the IP VPN of the enterprise network (step 190). In this case, both media endpoints must be in the same enterprise IP VPN.

Figure 3C:
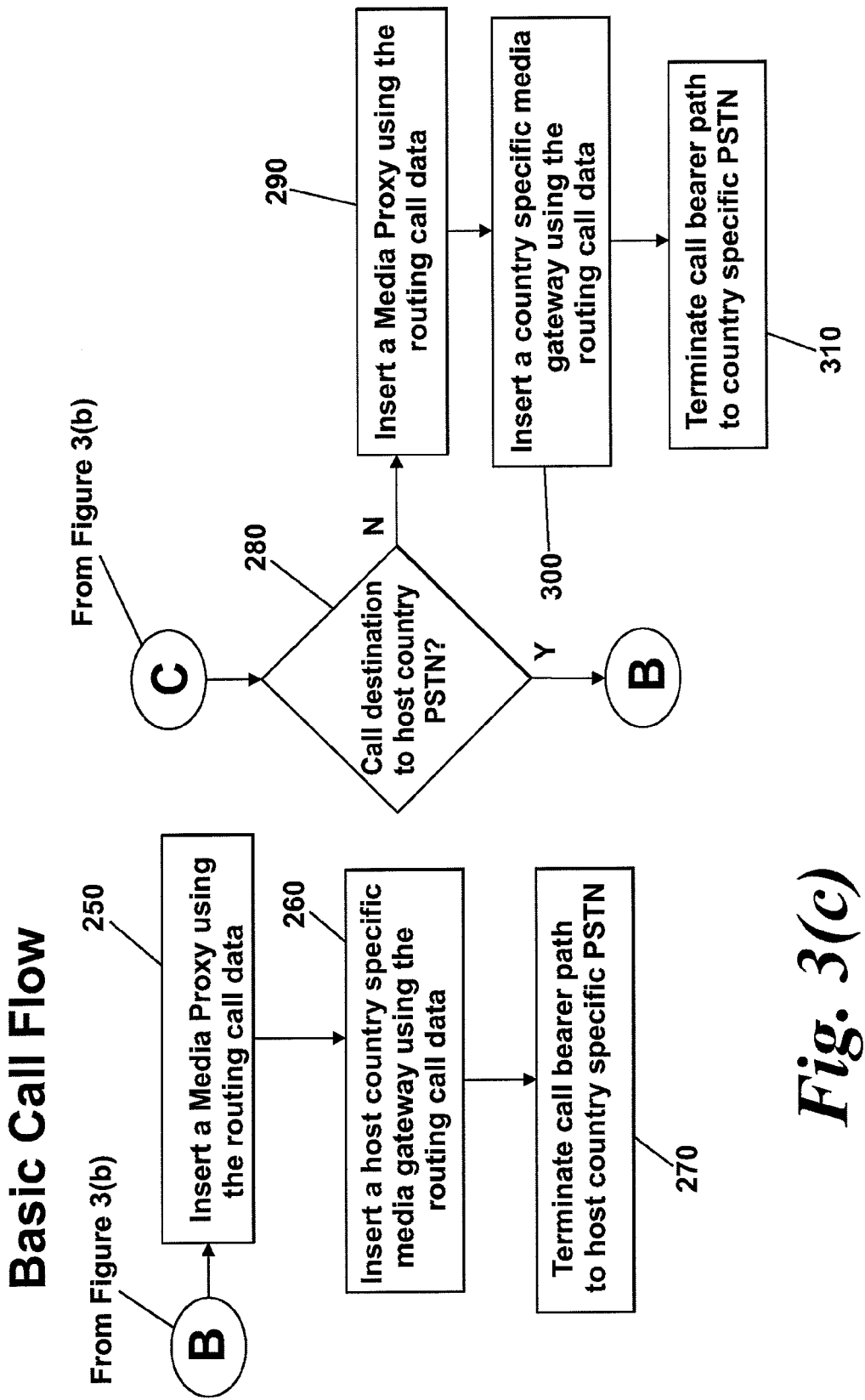

Referring again to decision point 160, where it is determined that the call destination is to a PSTN ME then a determination is made as to whether the call originates from a PSTN (decision point 200). If the determination at decision point 200 is that a call has originated from an enterprise then a determination is made as to whether the call destination is to a host country PSTN, i.e. is to the PSTN in which the enterprise ME is located (decision point 210). Where it is determined that the call destination is to a PSTN in another country then the call agent 48 provisions a media portal using the routing call data (step 220), provisions a media gateway specific to the country PSTN containing the destination ME using the routing call data (step 230) and terminates the call bearer path to the country specific PSTN (step 240). The media portal provisioned by the call agent provides the means by which IP packets of the VoIP call from the enterprise telephony enabled ME are conveyed to the service provider network and the country specific media gateway provides the means by which the telephony call from the enterprise ME is routed to the PSTN destination ME. It will be understood that the bearer path so provisioned will be bidirectional.

Where it is determined at decision point 200 that a call has originated from an enterprise and that the call is destined to terminate in the host country PSTN (decision point 210), then, referring to FIG. 3c, the call agent provisions a media portal for the enterprise IP VPN and service provider network using the routing call data (step 250), provisions a host country specific media gateway using the routing call data (step 260) and terminates the call bearer path to the host country specific PSTN (step 270).

It will be seen that the call set-up process for a call connection between an enterprise ME with an ME in the host country PSTN is substantially similar to the call process setup for a call between an enterprise ME and an ME of a PSTN in another country. The contrast between the call setup processes is, however, the choice of media gateways to interface with the different PSTNs. The benefit of the process of the present invention is the ability of the call agent to take account of the differences in the dialing plans etc of different PSTNs and the manner in which it does this will become clear from the descriptions of exemplary call connection setups contained hereinafter.

Interworking Intra and Extra country is done differently as will be appreciated from the following.

The incoming call is served by a call agent that will inspect the associated call data and mark that data to indicate the call is originated from a particular country served by the call server platform.

The call will pass to the translations and routing algorithms for that particular country dial plan and this allows the call server country specific dial plans to be resident on the same platform but partitioned to allow co-existence.

If the call destination is to the same country that the call agent is serving then the call data is marked to indicate that the call is a national specific call and should be handled according to the regulatory and operational rules of that host country. The call is then routed back into the serving country.

If the call destination is to another country hosted by the call server then the call data is marked to indicate that the call is now to cross international boundaries, and a different set of call processing rules now apply. The call destination country specific dial plan can now be accessed and the call can be terminated according to the destination country regulatory and operation rules.

This allows the call agent to handle multiple per country dial plans and effect transfer between those dial plans in a secure manner, obeying the regulatory environments of the host and destination countries.

This also allows the call agent to partition the per country dial plans and remove a hierarchical level of the network, previously the domain of an international specific switch.

Continuing with the call request call processing steps executed by the call agent 48, in the event that it is determined that a call originates from a PSTN (decision point 200, FIG. 3(b) and it is further determined that the call is destined to an ME in the host country (same) PSTN (decision point 280) then the call agent implements steps 250, 260 and 270 (FIG. 3(c)) in order to complete the call connection between the originating ME and the destination ME in the same PSTN. However, in the event that it is determined that a call originates from a PSTN (decision point 200, FIG. 3b) and that it is destined to a PSTN in another country (decision point 280, FIG. 3c) then the call agent provisions a media portal between the enterprise IP VPN and the service provider network (step 290), provisions a country specific media gateway using the routing call data (step 300) and terminates the call bearer path in the country specific PSTN (step 310). It will be appreciated that in the case where it is determined that a call has originated in a PSTN that the call request received by the call agent will have been received via an appropriate media gateway for the originating PSTN. Consequently, for a call that both originates in a PSTN and is destined for a PSTN then the call bearer path will include a media gateway for the originating PSTN, a media portal between the service provider network and the enterprise IP VPN and a media gateway for the destination PSTN. The enterprise network is therefore able to operate both an enterprise private telephony dialing plan and a PSTN compatible dialing plan.

The call agent in the embodiment of the present invention is arranged to be compatible with the different dialing plans, etc, encountered in the different country PSTNs as will become apparent from the following call connection examples. In the description of these examples, the numerals utilised in FIG. 1 will be employed to denote like parts.

Figure 4:
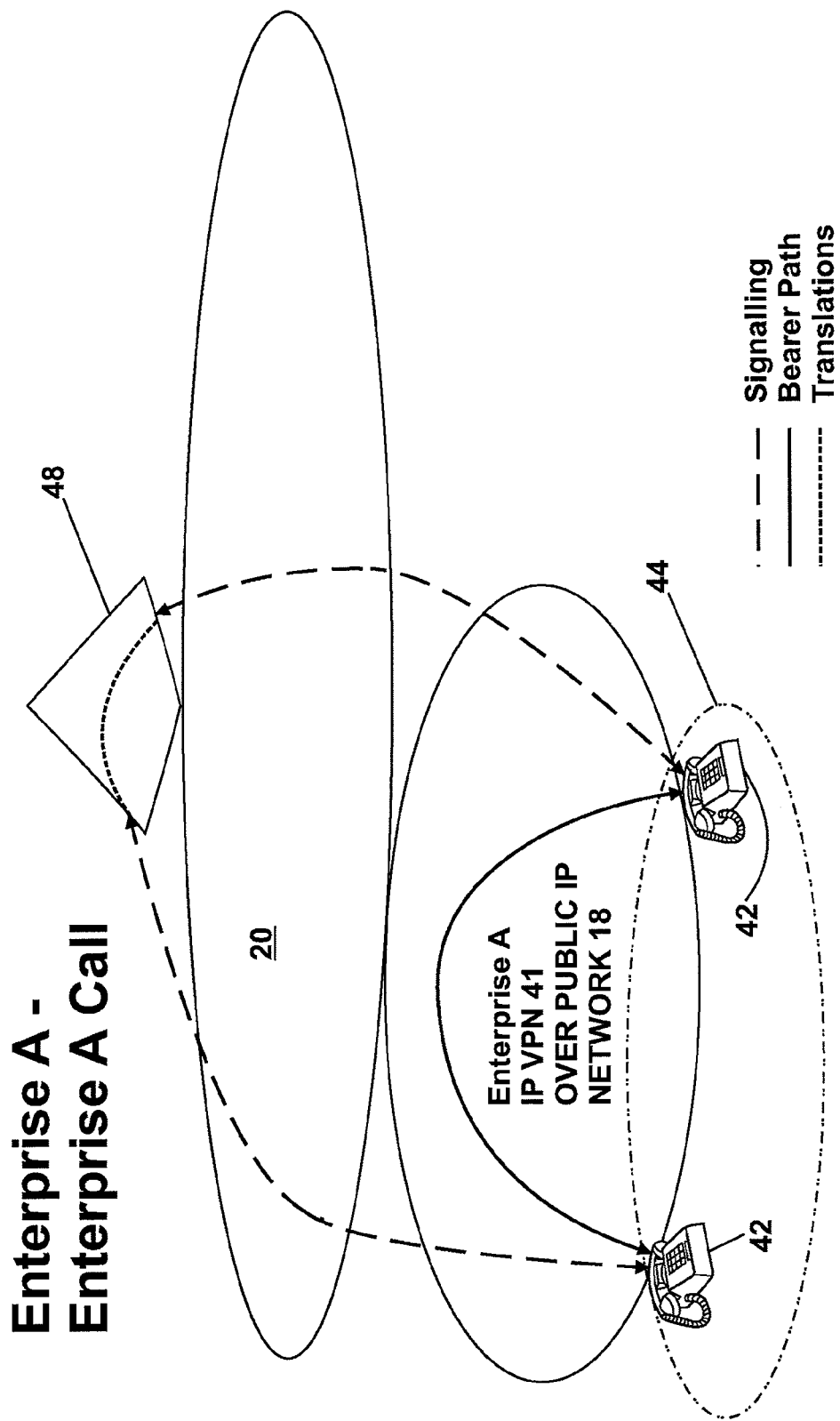
FIG. 4 is a schematic block diagram of an enterprise telephony VPN illustrating the establishment of a call within the enterprise telephony VPN.

FIG. 4 is a schematic block diagram logically representing ENT.A IPVPN 41 over public IP network 18. FIG. 4 illustrates the signalling and translation processes together with the provisioned bearer path for a call established between two telephony enabled MEs (42) residing within the enterprise telephony VPN 44. It should be understood that the telephony enabled MEs 42 could be located within the same site of ENT.A network 10 or in separate sites which also could be in different countries.

Figure 5:
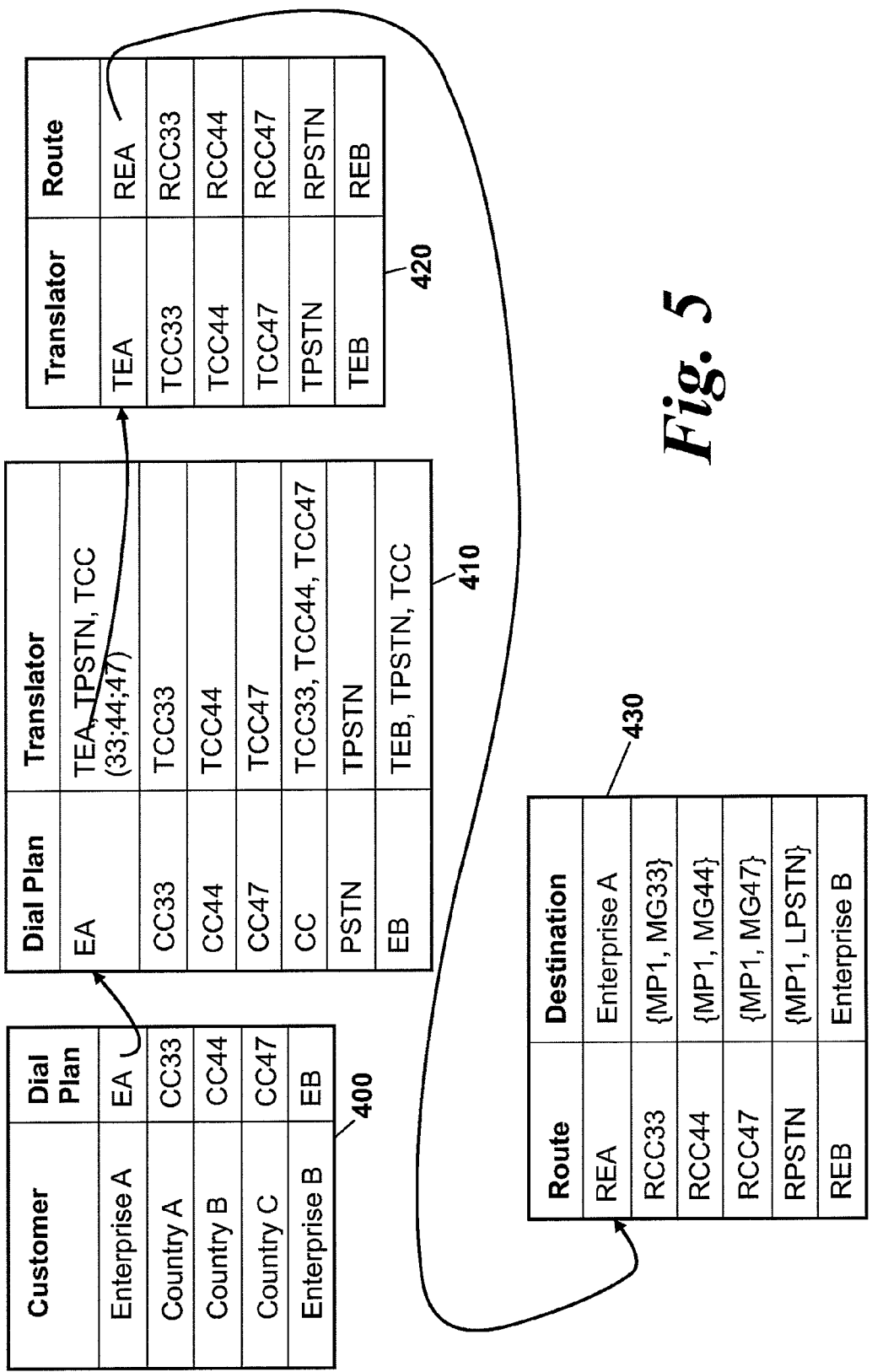
FIG. 5 is a flow diagram illustrating the call agent database provisioning in the establishment of a route through the enterprise telephony VPN for the call depicted in FIG. 4.

FIG. 5 is a diagram logically representing the data provision process enabled by the call agent 48 to establish a call between the telephony enabled MEs 42 of ENT.A network 10 when processing a call request received from a first one of said telephony enabled MEs 42. Upon receipt of said call request, the call agent 48 identifies from the call requested data that the originating endpoint is an ENT.A telephony enabled ME 42. The call agent 48, by reference to its dial plan database 50, can map a dial plan EA to enterprise A as represented by box 400 in FIG. 5. Having identified the dial plan EA for enterprise A, the call agent 48 can utilise the identity of the dial plan EA in its translations database 52 in order to select the appropriate translations database for the establishment of a call between the MEs 42. This process is represented by box 410 in FIG. 5 in which it can be seen that the dial plan EA for enterprise A has in its translations database three different dial plan translators identified respectively as TEA, TPSTN, TCC. The call agent 48 will have identified from the call request call data that the call destination in this example is another telephony enabled ME within the ENT.A network 10. As such, it selects translator TEA which is the translator associated with call setup between two MEs 42 within the ENT.A network 10.

The translator for enterprise A dial plan EA designated TPSTN is the translator specific to call setup between an ME 42 in ENT.A network 10 and the PSTN local to the ME42. The translator designated TCC in box 410 of FIG. 5, is the translator specific to call setup between an ME 42 of the ENT.A network 10 and the country specific PSTN for a PSTN in another country to that of ME 42.

Having identified the translator specific to a call setup between two MEs 42 of ENT.A network 10, the call agent 48 retrieves from its routing database 54 a route specified by the selected translator as illustrated by box 420 in FIG. 5. In this example, a signal route is identified by designation "REA" in box 420 and the call agent 48 recognises that this route is a route which wholly resides within the ENT.A IP VPN 41 (represented by box 530 in FIG. 5). Thus the call agent 48 is not therefore required to access its gateway selection database 56 on this occasion to obtain any media gateway and/or media portal selection data, except for the need to map to a media endpoint in the same enterprise IP and/or telephony VPN.

In the call connection example illustrated by FIGS. 4 and 5, the bearer path provisioned between the telephony enabled MEs of the ENT.A network 10 remains within the ENT.A IP VPN 41. As such, the path provisioning process in this example encounters no geographical or political limitations and is similar in its outcome to the path provisioning process that would be encountered in known enterprise VoIP networks.

The translator TEA contained in translations database 52 of the call agent 48 is the means by which the dial plan of the enterprise network of the originating ME can be mapped to the dial plan of the destination ME. In this case, since the MEs reside within the same enterprise network, this step can be omitted from the VoIP call setup process.

Figure 6:
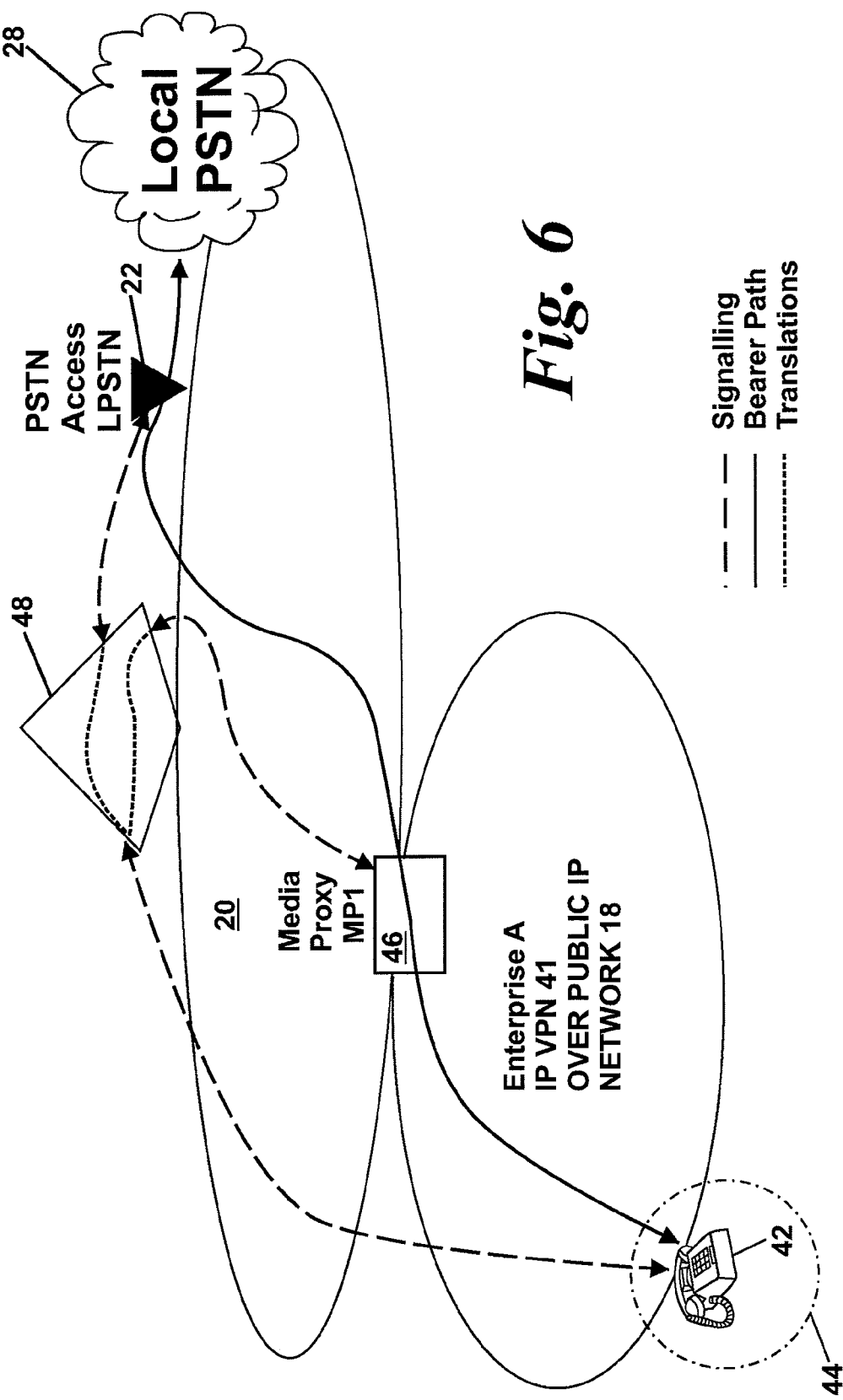
FIG. 6 is a schematic block diagram of an enterprise telephony VPN illustrating the establishment of a call between an endpoint in an enterprise site and a PSTN in the same country as said site.
Figure 7:
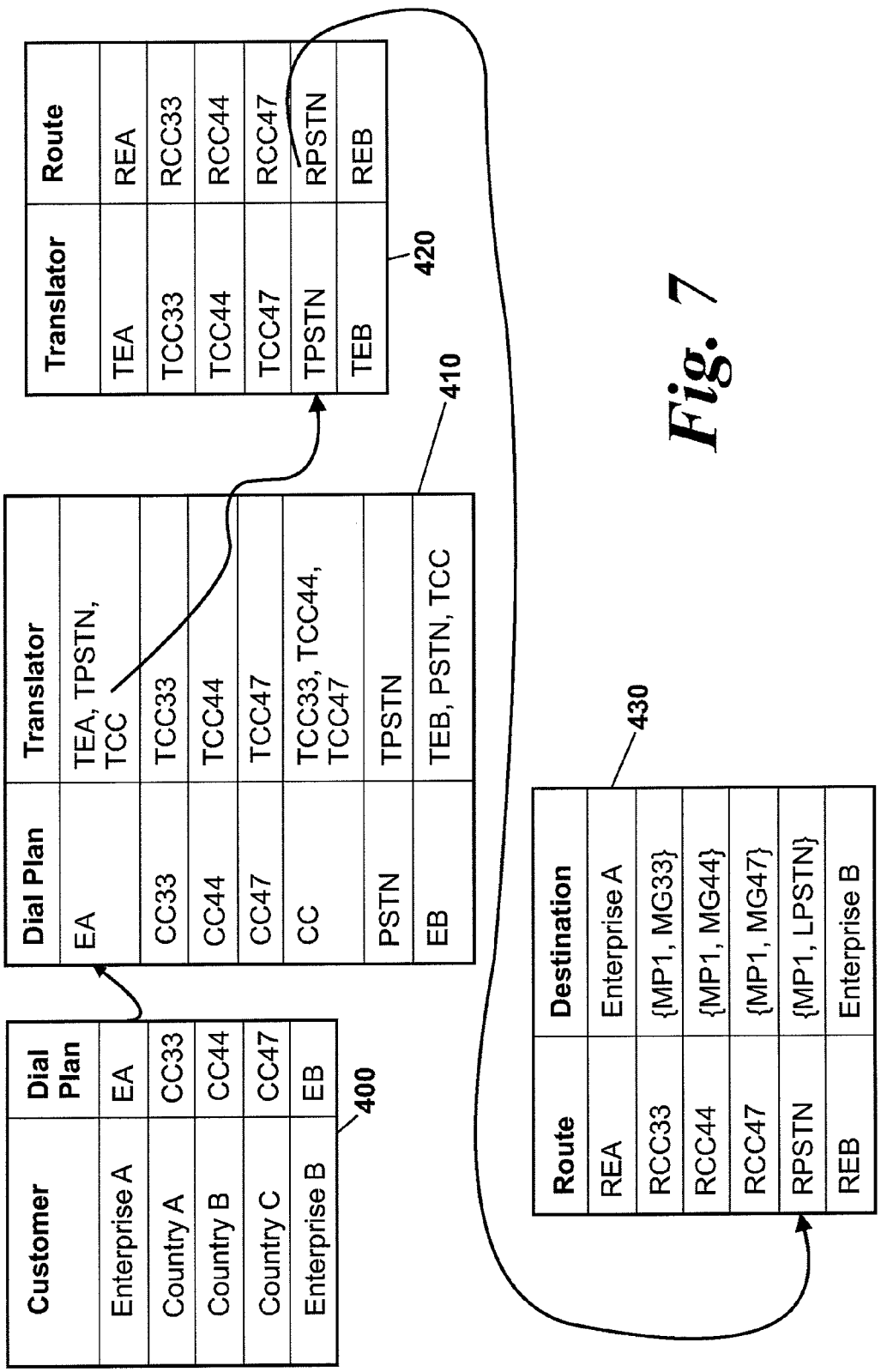
FIG. 7 is a flow diagram illustrating the call agent database provisioning in the establishment of the route for the call depicted in FIG. 6.

FIGS. 6 and 7 represents an example of a call setup between a telephony enabled ME 42 in the ENT.A network 10 and a media endpoint (not shown) in the host or local PSTN 28. In this example, it can be seen from FIG. 7 that the translator chosen by the call agent 48 is the translator designated "TPSTN" which is the translator specific to a call setup request between a media endpoint 42 of the ENT.A network 10 and a media endpoint in the host PSTN. The function of the TPSTN translator is to map the EA dial plan to the public dial plan utilised in the host PSTN 28, i.e. the translator TPSTN facilitates a translation between a private DN associated with an ME 42 of the ENT.A network 10 and its corresponding host PSTN DN. The translator also may map rules relating to regulatory requirements that must be met by the host PSTN but which may not be implemented in the operation of the enterprise private network. In the example illustrated by FIGS. 6 and 7, it can be seen that the translator "TPSTN" facilitates a selection of a route designated "RPSTN" which requires provisioning of a media portal 46 MP1, and a PSTN media gateway 22, designated "LPSTN", in the bearer path between the telephony enabled ME 42 of the ENT.A network 10 and the local/host PSTN 28. The media gateway 22 (LPSTN) will translate between media according to a format used in the pubic IP network 18 (FIG. 1) and the circuit switched format used in the host PSTN 28. In this example, the bearer path enables IP packet transmission within ENT.A IP VPN 41 between ME 42 and the media portal 46, which provides a network addressed translation function in a known manner to enable such IP packets to be addressed to the media gateway 22 (LPSTN) at which, as aforementioned, the IP packets are converted to a time division multiplex format, for example, compatible with that employed in the host PSTN 28. It is not necessary for the media portal to be located within the IP VPN, but it may be located elsewhere for convenience.

Figure 8:
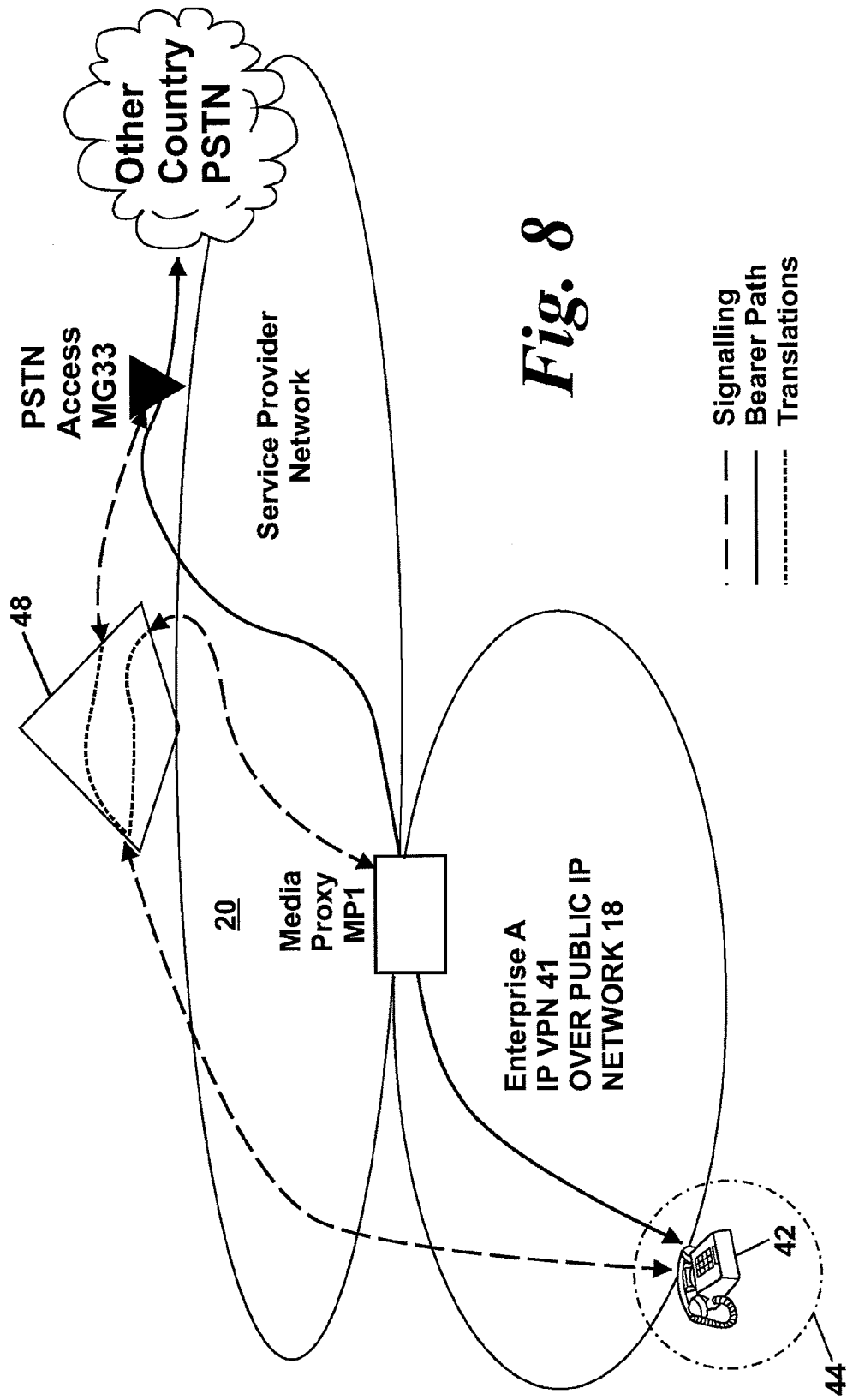
FIG. 8 is a schematic block diagram of an enterprise telephony VPN illustrating the establishment of a call from an endpoint in an enterprise site to a PSTN in another country.
Figure 9:
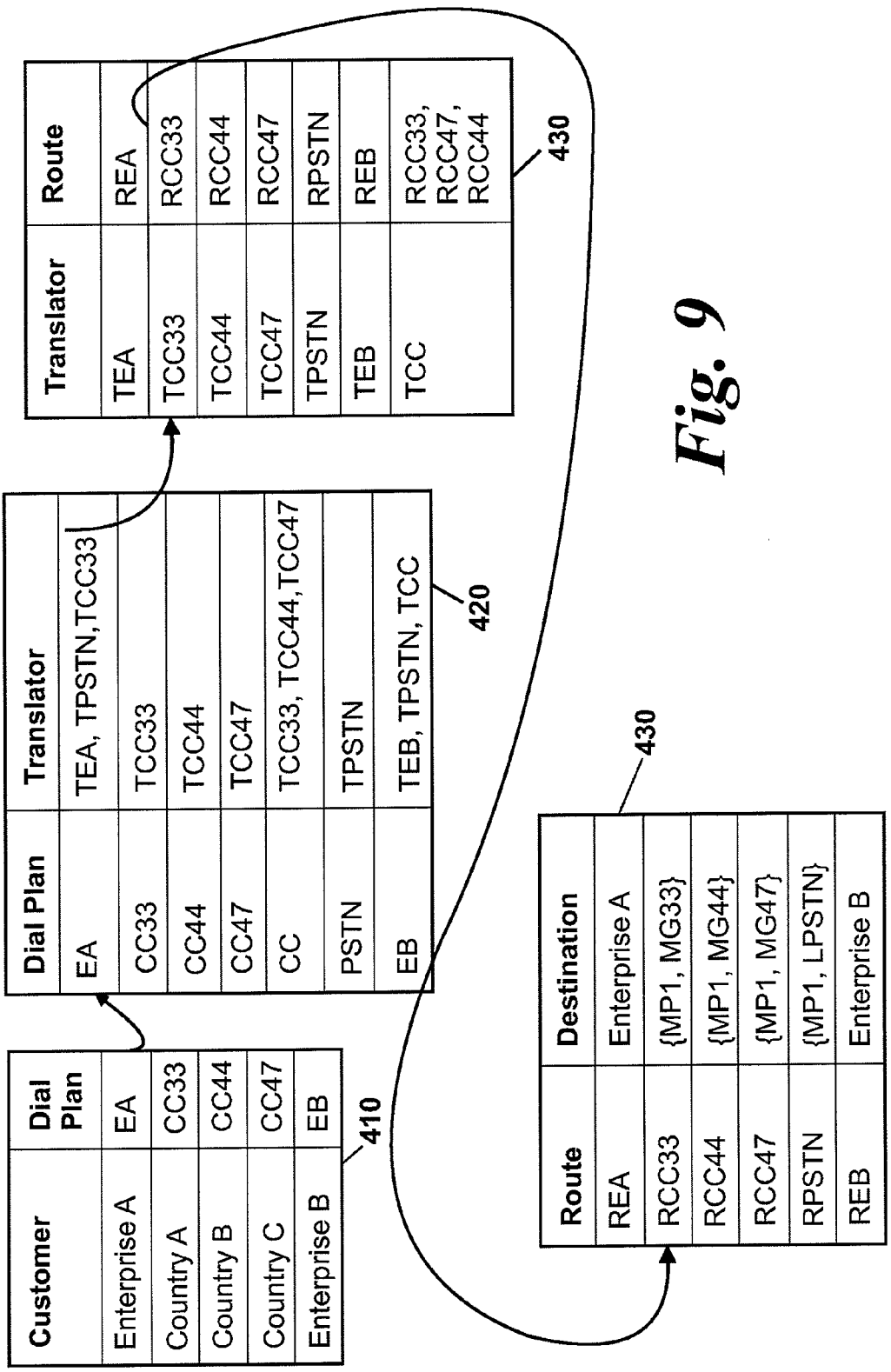
FIG. 9 is a flow chart illustrating the call agent database provisioning in the establishment of a route for the call depicted by FIG. 8.

Reference is now made to FIGS. 8 and 9 which illustrate an example of a call setup request and call setup between a telephony enabled ME 42 of the ENT.A network 10 and an ME in a country specific PSTN (30, 32) not being the host PSTN 28. In this example, it can be seen from FIG. 9 that the call agent 48 selects a translator which is specific to a call request between said ENT.A ME 42 and an ME (not shown) in said country specific PSTN (30, 32). The translator designated TCC 33 provides a mapping between the private dial plan EA of ENT.A and the public dial plan of the country specific PSTN having country code 33 (CC 33). By this means, the call agent 48 in say a first country is able to facilitate a call setup across the enterprise IP VPN 40 between an endpoint in an enterprise network site in said first country to an endpoint served by a PSTN (30, 32) in another country without the need for network intelligence (call agent) to be located in said other country. Consequently, the present invention provides a means by which a service provider can provide a telephony VPN for an enterprise across multiple sites located in multiple countries through a single call agent of said provider network associated with said enterprise, with said call agent being located in one country controlling media gateways located in the other countries to interface enterprise sites in those countries with their respective country specific PSTNs. It will be understood that the translator designated TCC 33 not only provides a means by which the private dial plan EA of ENT.A can be mapped to the public dial plan of the country specific PSTN designated by country code 33 but that it will also allow regulatory requirements peculiar to that country specific PSTN to be mapped between the private dial plan EA of the ENT.A network and the public dial plan of the country specific PSTN.

The method of the present invention will be further illustrated by reference to the following tables 1 and 2.

TABLE 1

| Country | Country Site Number | Private Dial Plan Site Prefix | Private Dial Plan Station Range | PSTN Country Code | PSTN Cite or Area Code | PSTN Exchange Code |
|---|---|---|---|---|---|---|
| X | 1 | 444 | 0000-9999 | +33 | 303 | 12 |
| X | 2 | 351 | 0000-9999 | +33 | 909 | 19 |
| Y | 1 | 560 | 0000-9999 | +47 | 7865 | 421 |
| Z | 1 | 393 | 0000-9999 | +44 | 4312 | 13 |

TABLE 2

| User 1 Enterprise | User 1 Site | User 1 Private Dial Plan Station Extension | User 1 Dials | User 2 | Media Flow | PSTN Involvement |
|---|---|---|---|---|---|---|
| A | 1 | 1234 | 4567 | Station 4567 in Enterprise A, Site 1 | Stay in Enterprise A IP VPN | None in any country |
| A | 1 | 1234 | 351 4567 | Station 4567 in Enterprise A, Site 2 | Stay in Enterprise A IP VPN | None in any country |
| A | 1 | 1234 | 560 7777 | Station 7777 in Country Y Enterprise A, Site 1 | Stay in Enterprise A IP VPN | None in any country |
| A | 1 | 1234 | 47-7865-400-7777 | PSTN access to Country Y non-enterprise site | Between Enterprise Network A and Country Y PSTN MG | Yes, via country Y PSTN access point |

Table 1 represents the presence of sites of an enterprise A in a number of countries X, Y and Z in which said enterprise has a carrier hosted VoIP VPN in accordance with the invention. It can be seen from table 1 that enterprise A comprises two sites in country X and one site each in countries Y and Z. Columns 3 and 4 of table 1 identify the private dial plan for enterprise A where each site of the enterprise is given a specific three digit private dial plan site prefix. For example, the prefix "444" identifies site 1 of enterprise A in country X whereas the prefix "393" identifies the single site of enterprise A in country Z. Column 4 identifies the private dial plan station range for each of the sites of enterprise A. The final three columns of table 1 identify elements of the public dial plan relating to the PSTN of the countries in which said sites are respectively located. Taking for example enterprise site 2 located in country X, it can be seen that the country code for its country specific PSTN is identified by numeral "33" and that said country specific PSTN dial plan for enterprise A site 2 in country X also has the area code designated by a numeral "909" and local PSTN exchange identified by numeral "19".

Referring now to table 2, this provides a number of examples of how call setup requests would be handled in the carrier provisioned VoIP enterprise network utilising the methods of the present invention for the enterprise A data of table 1.

In the following call handling examples described with reference to table 1, it is assumed that a call request is initiated by a user 1 located at site 1 of enterprise A in country X where said user 1 has a private dial plan station extension "1234".

Referring to row 1 of table 1, it can be seen that user 1 (ME1) at site 1 of enterprise A dials a number "4567". This identifies, via the private dial plan of the enterprise, a station "4567" also in enterprise A site 1. Consequently, in accordance with the process of the invention, the call agent will recognise that both user 1 and user 2 are located within the same site of enterprise A and that a call bearer path between said users can remain within the enterprise A IP VPN and so no PSTN involvement is required in establishing the call bearer path.

Referring now to row 2 of table 2, it can be seen that user 1 of site 1 of enterprise A dials an enterprise private number "3514567" which identifies a user station a having private dial plan station extension "4567" in site 2 of enterprise A which is also in country X. Once again, following the method of the invention, the call agent recognises that both user 1 and user 2 are both located within the enterprise network and consequently a call bearer path between them can be established within the IP VPN of the enterprise thus not requiring any involvement by a PSTN in any country.

Row 3 of table 2 provides an example of a call setup request from user 1 to a station having an extension "7777" located in site 1 of enterprise A in country Y. Once again, following the process of the present invention, the call agent recognises that both of the users reside within the enterprise network and that a call bearer path between them can be established through enterprise A's IP VPN and that no involvement of any country specific PSTN is required.

Row 4 of table 2 illustrates a call setup request between user 1 of site 1 of enterprise A located in country X to a user endpoint in a PSTN of country Y, said user endpoint being identified by its DN given in this example as "47-7865-400-777" where the prefix "47" identifies country Y, the four digit string "7865" comprises an area or city code for the user endpoint in the PSTN of country Y, the numeral string "400" identifies said users local exchange, and where the numeral string "7777" identifies the local exchange station code for that user. In this example, the call agent, following the process of the invention, identifies that the caller request has originated in an enterprise site located in country X and is to terminate within the PSTN of another country, namely country Y. Consequently, the call bearer path to be provisioned between user 1 of site 1 of Enterprise A and the end user in the PSTN country Y requires a least a media gateway interfacing the service provider network for enterprise A with the PSTN of country Y to be provisioned. However, in accordance with the present invention, the network intelligence, i.e. call agent, can remain located in country X but controls the media gateway interfacing the service provider network with the PSTN of country Y by means of the service provider public IP network over which the enterprise IP VPN is provisioned.

Where an enterprise having multiple sites in multiple countries wishes to establish a site in a new country and wishes to extend its VoIP network to said new country, it is only necessary for the service provider providing the enterprise VoIP network to install in said country a media gateway interfacing the public IP network of the service provider with the PSTN of that country. In such an arrangement, the media gateway would preferably be located at the edge of the enterprise's new site in the new country or in any other suitable location in that country. There is no requirement that the service provider would also need to install network intelligence in the form of a call agent within the political boundary of the new country since the present invention, through the translation processes described hereinbefore, provides a means by which the service provider can remotely control media gateways across political boundaries from another country and at the same time take account of the country specific public dial plans (and other setup arrangements peculiar to each country specific PSTN) with which it interfaces.

The arrangement of the present invention provides a service provider with advantages such as the obvious advantage of reducing the cost of extending an enterprise VoIP network into a new country since it negates the need to insert an expensive network intelligence apparatus within the political boundary of said country. A further advantage is a time to market advantage since it is a much simpler and speedy process to install and commission a media gateway within an enterprise site in a country than it is to also install and commission network intelligence apparatus in said country.

A further advantage that the present invention offers to service providers is the ability for such providers to employ their existing network infrastructure in a more intelligent manner with respect to providing VoIP services to enterprises. In the case of a new enterprise customer of a service provider, the service provider is able to select an existing call agent (or a small number of call agents) within its network which is conveniently located close to at least one site of the enterprise and to arrange said call agent as the central call agent for provisioning of VoIP network services across sites of the enterprise. There is no need to install a new call agent within the service provider network for that enterprise (or additional call agents for other sites of the enterprise). This provides a greater flexibility of the use of the existing network infrastructure of the service provider and also improves time to market advantages in provisioning VoIP services for a new enterprise customer.

It will be appreciated by a skilled artisan that there can be more than one media portal; the IP VPN should also include the public side of the NAT router; a single enterprise IP VPN can have one NAT router shared by each site and does not need one per site.

The invention claimed is:

1. A method of effecting a call from a first end point having a first type of call parameter to a second end point having a second type of call parameter, wherein at least one of the first and second end points are located within an IP virtual private network (IP VPN) and at least one is a telephony end point, the method comprising:
   providing a call agent at a point in a Service Provider Network (SPN),
   effecting the call in the call agent via a route over the IP VPN, the SPN, or a combination of the IP VPN and the SPN and translating, in the call agent, the call parameters of the call in dependence on the route selected, the translating being dependent upon a country where each of the first end point and second end point are located, and wherein the translating comprises translating a dialing plan used by the first end point to a dialling plan used by the second end point.

2. The method of claim 1, further comprising providing each of said first and second end points as telephony end points.

3. The method of claim 1, further comprising providing each end point in respectively a first and second country and each call parameter as a respective PSTN dialing plan.

4. The method of claim 3, further comprising providing the call agent in the same country as one of said end points.

5. The method of claim 3, further comprising providing the call agent in a third country.

6. The method of claim 1, further comprising providing a media gateway at a point in the network between the IP VPN and the SPN.

7. The method of claim 3, further comprising providing a media gateway at a point in the network between the SPN and a PSTN in one of said first and second countries.

8. The method of claim 1, further comprising providing said IP VPN as a VoIP VPN.

9. A Call Agent in a Service Provider Network (SPN) for effecting a call from a first end point having a first type of call parameter to a second end point having a second type of call parameter wherein at least one of the first and second end points are located in an IP Virtual Private Network (IP VPN) and at least one is a telephony end point, the call agent comprising a route planner for planning the route of the call over the IP VPN, the SPN or a combination thereof; and a translator for translating the call parameters of the call in dependence on the route selected, the translating being dependent upon a country where each of the first end point and second end point are located, and the translator being arranged to translate a dialing plan used by the first end point to a dialing plan used by the second end point.

10. The call agent of claim 9, wherein each of said first and second end points comprise a telephony end points.

11. The Call Agent of claim 9, wherein each end point is located in a respective first and second country and each call parameter is a respective PSTN dialing plan.

12. The Call Agent of claim 11, wherein the call agent is in the same country as one of said end points.

13. The Call Agent of claim 11, wherein the call agent is in a third country.

14. A computer program product encoded in a computer readable medium for implementing, in a primary computer system that has a primary mass storage device in which data is stored and that communicates with a backup computer system, a method of effecting a call from a first end point having a first type of call parameters and a second end point having a second type of call parameters, wherein at least one of the first and second end points are located within an IP virtual private network (IP VPN) and at least one is a telephony end point, the method comprising:
   providing a call agent at a point in a Service Provider Network (SPN), effecting the call in the call agent via a route over the IP VPN; the SPN; or a combination of the IP VPN and the SPN and translating, in the call agent, the call parameters of the call in dependence on the network route selected, the translating being dependent upon a country where each of the first end point and second end point are located, and wherein the translating comprises translating a dialing plan used by the first end point to a dialing plan used by the second end point.

15. A network for effecting a call from a first end point having a first type of call parameter to a second end point having a second type of call parameter wherein at least one of the first and second end points are located in an IP Virtual Private Network (IP VPN) and at least one is a telephony end point, comprising:
   a call agent comprising a route planner for planning the route of the call over the IP VPN, the SPN or a combination thereof;
   a translator for translating the call parameters of the call in dependence on the route selected, the translating being dependent upon a country where each of the first end point and second end point are located, and the translator being arranged to translate a dialing plan used by the first end point to a dialing plan used by the second end point; and a media gateway between the IP VPN and the SPN.

16. A network according to claim 15, wherein each of said first and second end points comprise a telephony end point.

17. A network according to claim 15, wherein each end point is located in a respective first and second country and each call parameter is a respective PSTN dialing plan.

18. A network according to claim 17, further comprising a second media gateway at a point in the network between the SPN and a PSTN in one of said first and second countries.

19. A method for providing communication service between media end points, each media end point having certain parameters and wherein at least one media end point is within an Internet Protocol Virtual Private Network (IP-VPN), comprising:
 a) providing a call agent;
 b) receiving by the call agent a call request from a media end point; and
 c) processing by the call agent the call request such that the communication service is provisioned between the media end points irrespective of the difference of the particular parameters of the media end points, and wherein the processing comprises translating a dialing plan used by one media end point to a dialing plan used by another media end point, the translating being dependent upon a country where each of the media end points are located.

20. A call agent for effecting communication service between media end points, each media end point having certain parameters and wherein at least one media end point is within an Internet Protocol Virtual Private Network (IP-VPN), comprising:
 a) an interface to receive a call request from a media end point; and
 b) a data structure to provision the communication service in response to the call request such that the communication service is provisioned irrespective of any difference in parameters of the media end points, and wherein the data structure comprises data for translating a dialing plan used by one media end point to a dialing plan used by another media end point, the translating being dependent upon a country where each of the media end points are located.

21. A service provider network for providing communication service between media end points, each media end point having certain parameters, and wherein at least one media end point is within an Internet Protocol Virtual Private Network (IPVPN), comprising:
 a) a call agent having data structure such that the call agent can use the data structure to develop provisioning information to provision the communication service irrespective of any difference in parameters of the media end points, the data structure comprising data for translating a dialing plan used by one media end point to a dialing plan used by another media end point, the translating being dependent upon a country where each of the media end points are located; and
 b) means for communicating provisioning information to the media end points.

\* \* \* \* \*